March 8, 1966   J. R. MONKS, JR   3,239,324
METHOD AND APPARATUS FOR AGITATING MOLTEN GLASS
Filed March 7, 1962   6 Sheets-Sheet 1

INVENTOR.
JOSEPH R. MONKS
BY
J. R. Nelson
and W. A. Schaich
ATTORNEYS

March 8, 1966 J. R. MONKS, JR 3,239,324
METHOD AND APPARATUS FOR AGITATING MOLTEN GLASS
Filed March 7, 1962 6 Sheets-Sheet 4

INVENTOR.
JOSEPH R. MONKS
BY
J. R. Nelson and
W. A. Schaich
ATTORNEYS

March 8, 1966     J. R. MONKS, JR     3,239,324
METHOD AND APPARATUS FOR AGITATING MOLTEN GLASS
Filed March 7, 1962     6 Sheets-Sheet 6

INVENTOR.
JOSEPH R. MONKS
BY
J. R. Nelson and
W. A. Schaich
ATTORNEYS

United States Patent Office 3,239,324
Patented Mar. 8, 1966

3,239,324
METHOD AND APPARATUS FOR AGITATING MOLTEN GLASS
Joseph R. Monks, Jr., Toledo, Ohio, assignor to Owens-Illinois Glass Company, a corporation of Ohio
Filed Mar. 7, 1962, Ser. No. 178,022
8 Claims. (Cl. 65—134)

The present invention relates to a method of and apparatus for producing non-thermal currents in a body of molten glass and more particularly to a method of and apparatus for producing and controlling non-thermal convection currents in a body of molten glass in accordance with the temparature of a portion of the molten glass body.

It has been previously proposed that non-thermal currents be generated within glass bodies, for example within a glass melting tank, by the bubbling of a gaseous medium through the molten glass body or by otherwise agitating the glass body. For example, in Patents Nos. 2,884,744, 2,387,222, and 2,890,548, various means for producing gaseous bubbles within a body of molten glass have been proposed.

The present invention proposes a modification of these earlier patented concepts in that the bubbling of the gaseous medium through the molten glass body is controlled in accordance with the sensed temperature of a portion of the molten glass body. The primary reason for bubbling gaseous medium through a molten glass body is the generation of non-thermal agitation currents in the glass body. Such agitation is desirable to reduce the temperature gradient in the body, i.e. the temperature difference between the upper hotter layers of the molten glass in a conventional combustion-fired glass melter and the lower colder portions, due to the fact that only the upper surface of the molten body is subjected to the combustible gasses and to the greater density of the cooler bottom glass. Less obviously, but equally importantly, a temperature gradient occurs between portions of the glass body adjacent the sides of the melting tank and at the center of the melting tank, due to radiation losses through the refractory furnace lining, the alternate firing from the side firing ports, and other factors.

In all of the various proposals which have been heretofore made, the gaseous bubbling medium is merely introduced through the melting tank floor for passage upwardly through the molten glass body to agitate the body and, thereby, to more-or-less equalize the temperature gradient between the lower regions of the body and the upper regions thereof. The bubbling rate and the volume of gaseous medium introduced into the bubbler has been rather arbitrarily decided, and the bubblers are operated in accordnace with a predetermined frequency and volume. The present invention introduces a new element into this conventional arrangement; namely, the element of temperature-responsive control of agitation. This control is responsive upon the temperature of a portion of the molten glass body, preferably at the lower regions of the glass body, since this is the area at which agitation is necessary and most effective.

The control of agitation in response to temperature can be accomplished in any desired manner. For example, the temperature responsive control may simply turn a bubbler "off"-or-"on" or, alternatively, may vary the frequency of bubbles emitted from a bubbler of the type disclosed in Patent No. 2,890,548 or, alternatively, may vary the pressure at which bubbles are emitted from a constanct flow or "indiscriminate" bubbler of the type disclosed in Patents Nos. 2,884,744 and 2,387,222, or alternatively, a vortex screw-type impeller can be either actuated or speed-regulated in accordance with the sensed temperature.

One or more agitating means, whether a bubbler or a screw-type impeller, can be controlled by a single temperature-sensing unit, such as a thermocouple.

By utilizing a thermal-responsive element, such as a thermocouple, located at and capable of sensing the temperatures of the lower level glass within a body of molten glass, it is possible to control the agitation of the glass body to obtain a desired temperature gradient with precision and with extremely desirable results not heretofore attainable. Further, there are always present in a body of molten glass so-called "normal" thermally-induced convection currents which necessarily effect some flow of glass, and therefore some limited degree of agitation, within the glass body. By sensing the temperature of the glass at any desired location, full advantage can be taken of these normal convection current and agitation of the body, or of various localized portions of the body, can be closely correlated to the agitation normally occuring due to such thermally induced currents.

Additionally, by agitation in response to temperature it is possible to locally increase the degree of agitation in chronically cold regions, e.g. adjacent the sides of the melter tank or other container, to an extent greater than the degree of agitation at other normally hotter regions, e.g. at the center portions of the melter tank. Thus, the present invention makes possible close equalization of temperatures throughout the molten glass body and the prevention of channeling of glass merely down through the center of the melter tank or other container. Further, the more nearly equal glass flow and the more uniform overall temperature within the glass body, in addition to the agitation, promotes the homogenous mixing of the glass body, thus preventing the occurrence of localized areas of non-homogeneous composition.

All in all, the accuracy of control afforded by the present invention, the control of agitation throughout the glass body in response to the sensed temperature of any desired portion of the glass body, and the resultant formation of a molten glass body which is homogeneous in its thermal and chemical character is extremely advantageous and provides a new and novel approach to closer control over the melting and refining portions of the glass making process.

It is, therefore, an important object of the present invention to provide a method of and apparatus for controlling the agitation of a body of molten glass in accordance with the sensed temperature at a predetermined location in said body of molten glass.

Another important object of this invention is the provision of a method of controlling the lower level temperature in a body of molten glass by sensing the lower level temperature of a portion of the body and agitating the glass in response to the sensed temperature.

It is a further important object of this invention to provide an apparatus including a means for agitating a local portion of a body of molten glass and means for controlling the agitation means in response to the temperature of the localized area of the molten body.

Yet another, and no less important, object of the present invention is the provision of a method of and apparatus for agitating a body of molten glass by bubbling a fluid through the glass body and controlling the extent of bubbling in accordance with the temperature of a portion of the glass body.

Other objects of this invention will appear in the following description and appended claims, reference being had to the accompanying drawings forming a part of this specification wherein like reference characters designate corresponding parts in the several views.

On the drawings:

FIGURE 6 is a schematic circuit diagram illustrating a control circuit for the bubbler of FIGURES 4 and 5;

FIGURE 7 is a different form of bubbler control circuit; and

FIGURE 8 is a vertical section view similar to FIGURE 4 illusrtating a different agitation mechanism.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
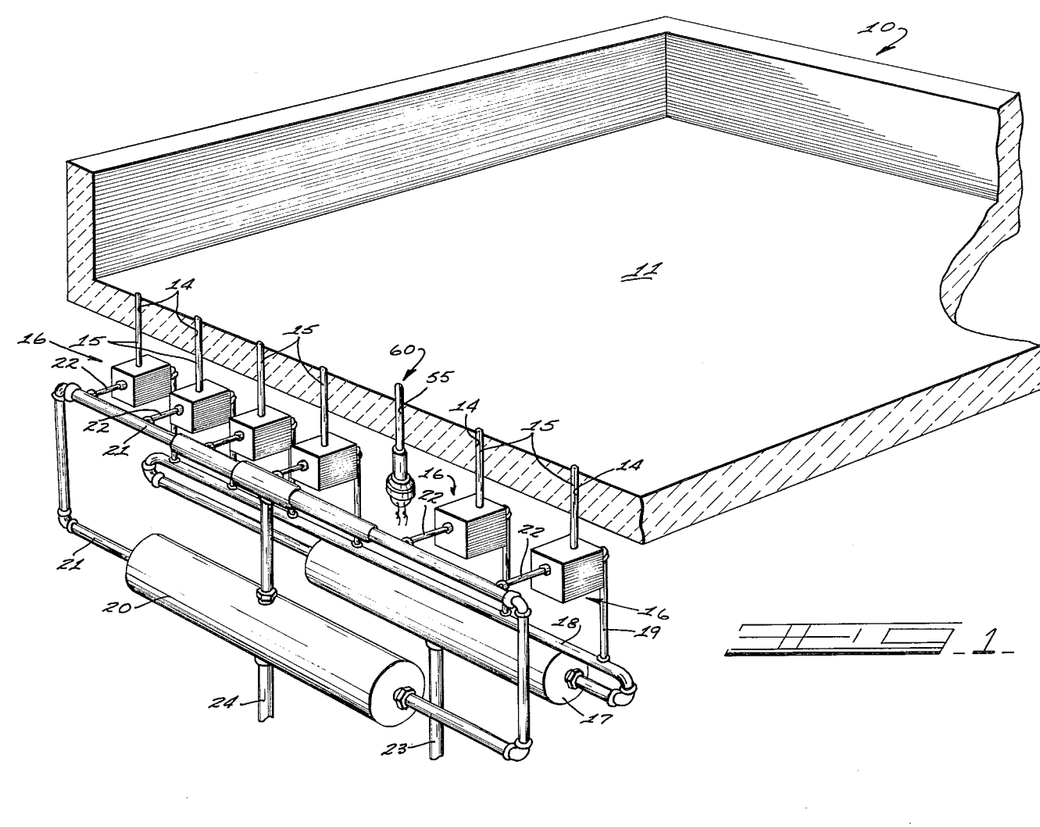
FIGURE 1 is a perspective elevational view, with parts broken away and in section, and somewhat schematic in nature illustrating a device of the present invention capable of carrying out the method of this invention.
Figures 2, 3:
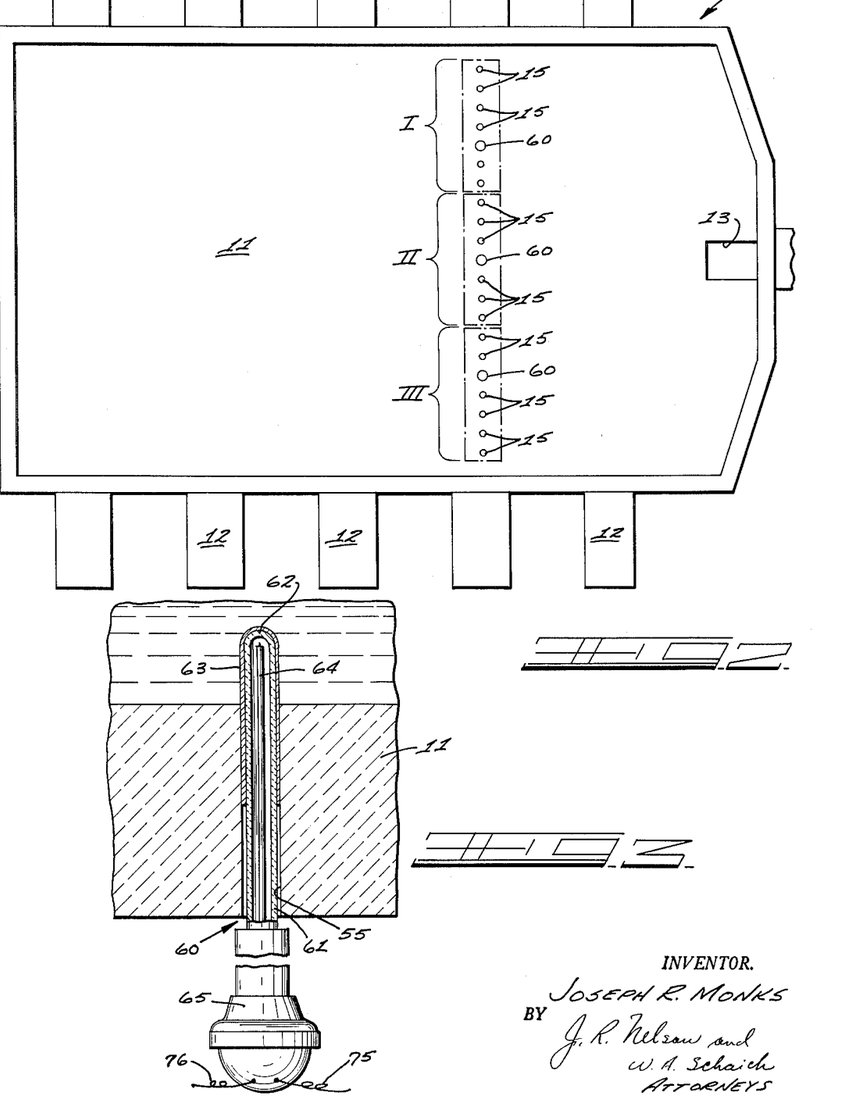
FIGURE 2 is a plan view, also somewhat schematic, illustrating the apparatus.
FIGURE 3 is a vertical sectional view illustrating a temperature sensing element.

As shown on the drawings:

In FIGURES 1 and 2 of the drawings, there is shown a conventional glass melting tank or refiner 10, preferably formed of, or at least lined with, zircon or similar refractory material. The bottom 11 of the tank is adapted to receive thereon a molten glass body. In those instances in which the container 10 is a gas-fired melter, a plurality of lateral firing ports are provided above the level of the glass, and through which burner structures, indicated generally at 12 (FIGURE 2), direct a combustible gas directly onto the surface of the molten body. The melter 10 is provided with a throat outlet 13 leading to a refining tank (not shown).

The bottom 11 is pierced by a plurality of vertical apertures 14 which may be arranged in the bottom in any desired pattern. In the illustrated embodiment of the invention, eighteen such openings or apertures 14 are provided, the apertures being substantially equally spaced in transverse alignment across substantially the entire width of the bottom 11. Of course, the number and alignment of these apertures are capable of variation and the disclosed arrangement is exemplary, only.

Figures 4, 5:
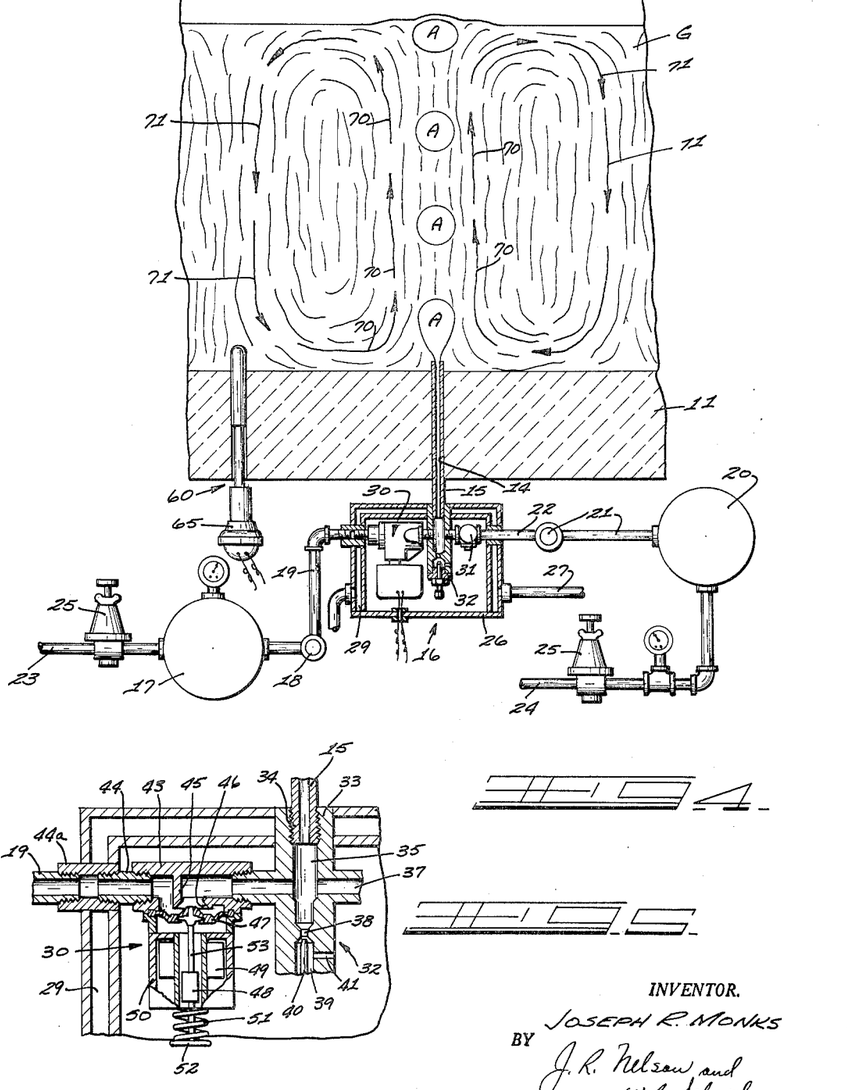
FIGURE 4 is a vertical sectional view illustrating an intermittent bubbler device forming a portion of the apparatus.
FIGURE 5 is an enlarged fragmentary sectional view illustrating the bubbler actuation mechanism.

As best illustrated in FIGS. 1, 4 and 5, each of the vertical apertures 14 has positioned therein a vertically projecting bubbler tube 15, constructed of a heat resistant material, e.g. porcelain or platinum. The upper end of each such bubbler tube 15 projects above the bottom 11 of the melter, and the tube also depends beyond the undersurface of the melter bottom to be received in a bubbler control element indicated generally at 16. Each such control element 16 is connected to a high pressure air supply manifold 17 by manifold conduits 18 and individual high pressure supply pipes 19. Similarly, each bubbler control unit 16 is connected to a low pressure air manifold 20 by means of low pressure conduits 21 and individual pipes 22. The high pressure manifold 17 is connected to a suitable source of air at relatively high pressure by a line 23, while the low pressure manifold 20 is connected to a relatively lower pressure source of air, as by line 24.

From FIGURE 4, it will be seen that the supply pipes 23 and 24 are provided with pressure regulators 25, respectively, for maintaining the desired differential air pressure within the maniolds 17 and 20.

As best shown in FIGURES 4 and 5, the bubble control units 16 each include a housing 26 having its upper and side walls water cooled by the flow of water through inlet and outlet conduits 27 and 28, respectively, and through a water jacket 29. Such cooling is necessitated because of the proximity of the housing to the intense heat of the furnace floor 11. Mounted within the housing or casing 26 is a solenoid actuated valve 30, a check valve 31 and a central, cruciform pipe nipple 32. The pipe nipple 32 comprises an upper portion 33 threadedly receiving the lower end 34 of the bubbler tube 14 and enclosing a central air chamber 35 communicating through lateral branch passages 36 and 37 with high pressure air from manifold 17 and low pressure air from manifold 20, respectively. The chamber 35 communicates at its lower end through a restricted valve port 38 with a lower relief valve chamber 39 having a threadedly adjustable needle valve 40 and a lateral exhaust passage 41 for a purpose to be hereinafter more fully described.

The check valve 31 accommodates the flow of low pressure air from the manifold 20 and the pipes 21 through the conduit 22 into the passage 37 communicating with the bubbler pipe 14 through valve passage 35. However, the check valve 31 prevents the flow of air from the chamber 35 and the chamber 37 into the low pressure manifold 20.

Interposed between the passage 36 and the high pressure air supply line 19 is the solenid actuated valve 30. This valve includes an upper valve body 43 connected at one side through a nipple 44 and a collar 44a to pressure supply line 19 and threadedly attached at the other end to the central pipe nipple 33 in communication with the passage 36 thereof. An interior valve body wall 45 subdivides the interior of the valve body 43, so that high pressure air flowing through the valve body 43 must pass through a downwardly facing frusto-conical valve seat 46. This valve seat 46 is controlled by means of a diaphragm 47, the diaphragm being movable by its connection centrally thereof through a core stem 53 to a vertically reciprocable solenoid core 48 actuatable upon energization of a solenoid winding 49 enclosed within a surrounding casing 50. The diaphragm 47 is urged to its normally open position by means of a coiled compression spring 51 interposed between the casing 50 and a reaction plate 52 secured to the lower extremity of the core stem 53. Energization of the coil 49 attracts the core 48 upwardly to bring the diaphragm 47 into contact with the valve seat 46, thus closing the valve against the force of the spring 51.

The bubbler structure heretofore described is substantially the same as that disclosed and claimed in the patent to Joseph W. Wright, No. 2,890,548, assigned to the assignee of the present invention. The operation of the device is also substantially the same as disclosed in said patent, in that low pressure gas is continuously supplied to the chamber 35 from the manifold 20 for each of the bubbler units 16. The pressure setting of the regulator 26 of the low pressure side is such that the pressure maintained in the chamber 35 will balance the pressure head exerted by the molten glass on the bubbler tube 14.

High pressure gas is supplied from the manifold 17 into the inlet side of the valve 30. The valve 30 is normally open, by virtue of the spring 51, and the valve is actuated to closed position by energization of the solenoid winding 49. By rapidly intermittently opening and closing the valve 30, i.e. by de-energizing and energizing the coil 49, measured volumes of high pressure air or other gas are injected into the bubbler tube 14 and exploded at the bubbler nozzle defined at the free upper end of the tube to form enlarged gas bubbles A at the bottom level of the molten glass G contained in the melter 10. As illustrated in FIGURE 4 of the drawings, these gas bubbles A rise through the molten glass to create a current within the glass body.

In FIGURES 1 through 4, it will be seen that the bottom 11 of the tank 10 is also provided with additional apertures 55. Through these apertures projects a temperature-responsive thermocouple 60, illustrated in detail in FIGURE 3.

More specifically, this thermocouple comprises a refractory, i.e. porcelain, shell 61 which is generally cylindrical in configuration and which has a closed upper end 62. This shell 61 is arranged coaxially of the aperture 55 and is housed at its upper end in a thimble 63 of platinum, molybdenum, or other temperature resistant metallic material, this thimble 63 serving as a sheath or cover for the porcelain tube 61 to prevent damage thereto from the heat of the molten glass and from erosion due to the flow of the molten glass.

Projecting axially through the porcelain sleeve 61 is a second porcelain tube 64 bearing the thermocouple electrical elements which are subject to the temperature of the molten glass and which have a resistance proportional to the temperature to which they are subjected. These electrical elements lead through a bulb 65 disposed beneath the floor 11 of the refiner.

From FIGURE 2, it will be noted that the bubbler tubes 14 dispersed across the width of the melter 10 are subdivided into groups I, II and III. It will be noted further that each of these groups consists of six bubbler tubes and that a single thermocouple 60 is utilized to control operation of the tubes of each such group as hereinafter more fully explained. In the center group, group II, the thermocouple is located centrally of the group of bubblers, while in the other two groups, namely groups I and III, the thermocouple is located eccentrically of the length of the group. If desired, the thermocouple may be displaced slightly to one side or the other of the median plane or center line of the bubbler tubes.

In any event, the thermocouple is located in proximity to the bubbler tubes which it controls and is responsive to and gives an accurate reading of the temperature adjacent the bottom wall 11 of the melter or refiner 10.

Further, it is not necessary that a group of bubbler tubes be utilized in conjunction with each thermocouple, although such is usually the case. Where desired or necessary, a given thermocouple may control a single, individual bubbler tube.

The action of the bubbles in equalizing the temperatures within the molten glass body G is well illustrated in FIGURE 4 of the drawings. The rising bubbles A will carry upwardly with them the adjacent molten glass. Since the glass in the bottom region of the body of molten glass G is always cooler than that glass in the upper regions subjected directly to firing from the burners 12 (FIGURE 2), the upward travel of the bubbles will carry colder molten glass to the top of the body of molten glass, as indicated by the directional arrows identified by reference numeral 70, while the warmer molten glass from the surface portions of the body of molten glass G will be carried downwardly as indicated by directional arrows 71.

As a result, the presence of the bubblers promotes the formation of a homogeneously heated glass body G having a temperature gradient from the lower regions to the upper regions thereof which is substantially less than the temperature gradient normally encountered.

Further, the currents effected by passage of the bubbles vertically through the molten glass body are "non-thermal" in that they are not generated because of heat differences or gradients witthin the material, but rather tend to promote the elimination of substantial termperature gradients and supplement the normally occurring thermal gradients. The currents induced in the molten glass body by the bubbler supplement the always-present thermal currents to insure circulation of glass within the molten glass body.

The thermocouples 60 sense the temperature adjacent the floor of the melter and, being heat responsive, actuate the bubbling mechanism whenever an undesirable temperature gradient occurs.

The mechanism for controlling bubbler operation in accordance with temperature is illustrated in FIGURES 6 and 7 of the drawings.

FIGURES 6 and 7 diagrammatically illustrate preferred forms of temperature-responsive controls for regulating the bubbling means 16 to impart controlled current agitation to the molten glass G in melter compartment 10. A thermocouple element 60 in the lower level of the glass body G is electrically connected by leads 75 and 76 to an electrically operated temperature recording instrument 17. Such recording instruments are well known in the art and need not be described in detail. The recorder 77 includes an electric motor (not shown) which is operated to adjust the pointer 78 of the instrument and record temperature sensed by the thermocouple 60. The axis or shaft 79 of this recorder is mechanically linked at 80 to the slider 81 of a potentiometer 82 in the circuit of the "off" timer 83, to be presently described.

A selective group of resistors are connected in parallel across potentiometer 82 at leads 84 and 85. Of the group, a fixed resistor 86 is in parallel across leads 84 and 85. Lead 85 is then connected to a pointer contactor 87 that may be alternatively set to include any one of the four resistors 88, 89, 90 and 91 in the parallel circuit, each of resistors 88–91 being connected to lead 84. A fifth setting for contactor 87 is at point 92 which is an open-circuit point leaving only resistor 86 in the circuit when pointer 87 is set thereat. The values of resistors 88–91 are each different so that the ultimate effect or sensitivity of the potentiometer 82 in the timer circuit (to be presently described) is variable. This is true since any one of resistors 88–91 and resistor 86 is parallel connected across potentiometer 82 and since parallel resistors inversely effect voltage of the potentiometer circuit, adding any of resistors 88–91 across the potentiometer 82 lessens the voltage drop across the potentiometer, thereby decreasing its effect when adding more resistance in parallel. Thus, movement of the slider 81 of the potentiometer 82 by the recorder movements may be regulated to have a greater or lesser effect on sensitivity of the circuit, depending on whether it is desirable for the control to react to either a wide or a narrower band of temperature change (sensitivity).

The timer 83 of FIGURE 6 incudes a thyratron, gas filled, tube 95, the plate voltage of which passes through the coil 96 of a normally open relay CR1 to control its circuit, as will be presently described, and to one side L1 of the supply line. The other side of the supply line L2 passes to the cathode of tube 95 and to the slider 81 of the potentiometer 82. The potentiometer is, so to speak, the heart of regulating the timer system. The supply line voltage L1, L2 is A.-C., preferably 110 volts.

A D.-C. supply is provided by the rectifier circuit comprised of transformer T1, tube 97 and filter, condenser 98 across leads 99 and 100. The D.-C. supply is connected from the positive side of the circuit through variable resistor 101, resistors 102 and 103 and variable resistor 104, and thence through grid current limiting resistor 105 to the grid of the tube 95, and also to the positive charging side of capacitor C1. The positive side of the circuit is also led through a resistor 106, a variable resistor 107, through the potentiometer 82 and a variable resistor 108 to the negative side of charging condenser C1. The negative side of the D.-C. supply leads directly to the negative side of the charging condenser C1.

A shunt circuit across the capacitor C1 is provided running from the positive side of the D.-C. charging supply, through a resistor 109 through the normally closed contacts of relay CR2 of the "on" timer 110 to the negative side of the D.-C. charging supply below the condenser C1. Relay CR2 is effective when the lower contacts thereof are opened to start or initiate the beginning of the timed interval of the timer 83.

To facilitate an easy conversion of timed interval of $x$ seconds to a division thereof, for example $x/10$ seconds, a shunt circuit 111 with switch 112 is provided across resistors 101 and 102. With these resistors shunted out of the circuit by switch 111 being closed, the timing range available from the full range of the potentiometer is reduced from $x$ to $x/10$ seconds.

A control circuit is established by lines 113 and 114 of which line 113 is connected as a shunt circuit at the positive side of the charging condenser C2 of the timer 110. This condenser sets up the "on" time interval of the unit. The line 114 completes this shunt circuit by a connection to the negative side of the D.-C. charging supply for condenser C2. The control circuit 113, 114 is made (closed) by relay CR1 when the latter is energized upon the firing of the thyratron tube 95. As the closing of relay CR1 marks the end of the timed interval of "off" timer 83, this is utilized to effect closing of the circuit for the "on" timer 110.

In operation, the D.-C. supply lines 99, 100 places a negative grid bias on the tube 95. This bias potential is varied by the setting of the potentiometer 82 effected by the connection to the temperature recording instrument 77. When the timer 110 operates to shift its relay CR2 and open the lower contacts thereof, the shunt across condenser C1 is removed and the condenser starts to charge as the inception of the time interval. This charging is from the common D.-C. supply that establishes the negative grid bias on tube 95. The charging of condenser C1 is continued until the positive voltage reaches a value nearly equal to the negative grid bias voltage. Tube 95 then fires and closes the relay CR1 and this closes the control circuit 113, 114. This extinguishes the thyratron of the second timer circuit 110. This circuit will now be described.

Timer 110 controls the "on" time for the solenoid-operated valve 30 of the bubbler 15. The timer 110 similarly includes a thyratron, gas filled, tube 115, the plate voltage of which passes through the coil 116 of the relay CR2, which, in this preferred embodiment, maintains its lower pair of contacts normally closed and its upper pair of contacts normally open, and then to one side L1 of the A.C. suply line. One of the upper contacts of CR2 is connected to the supply line L1 and the other contact is in circuit with the solenoid coil 49 of valve 30. Valve 30 controls the flow of high pressure fluid, as earlier described herein, to release measured volumes thereof into the glass body G. The solenoid coil 49 is preferably operated to close the valve, which incorporates a safety factor into the system. Since the valve is normally open and held closed by power of coil 49, an electric power feature will cause the fluid to continuously issue through the bubbling means 16 and prevent the tube thereof from clogging or freezing with glass. Valve 30 is, therefore, normally open and is closed by solenoid 49 which is operated for a preselected time interval of timer 110 to introduce the measured volume of the fluid through the bubbler pipe. Solenoid coil 49 is connected to the other supply line L2. A resistor-capacitor circuit 117, 118 is shunted across coil 49 to effect its proper operation of valve 30. The supply line L2 also passes to the cathode of tube 115 and to the slider of a potentiometer 120. As distinguished from the potentiometer hook up in timer 83, potentiometer 120 is manually regulated and obtains a setting thereby to effect a set period of "on" time, such as $2/10$ of a second.

A D.C. supply is similarly provided by the rectifier circuit of transformer T2, tube 121 and a condenser 122 across the leads 123, 124. The positive side of the D.C. supply of line 123 is connected through variable resistor 125, resistors 126 and 127, and variable resistor 128, and a grid current limiting resistor 129, then to the grid of the tube 115, and also to the positive charging side of capacitor C2. The positive side of the circuit is also connected through a resistor 130 and the potentiometer 120 to the negative side of the charging condenser C2. A similar shunt circuit 131 including a switch 132 is connected across resistors 125 and 126. This circuit enables regulating the timing range available from the range of the potentiometer 120. The negative side 124 of the D.C. supply leads directly to the negative side of charging condenser C2. As previously described, a shunt circuit, as control circuit 113, 114, is provided from the positive side of the D.C. supply for charging C2, through resistor 133 through the contacts of relay CR1, the latter being closed by firing of tube 95, and to the negative side of the D.C. charging supply. Relay CR1 is effective when opened to start the timed interval of the timer 110.

In operation, the D.C. supply in lines 123 and 124 place a negative grid bias on the tube 115 which is varied by the manual setting of the potentiometer 120. When the contacts of relay CR1 are opened, the shunt across condenser C2 is removed and the condenser starts its charge from the D.C. supply common with that which establishes the negative grid bias on tube 115. As the positive voltage on the condenser C2 is nearly equal the valve of the negative bias voltage on the grid of tube 115, the tube "fires" and shifts relay CR2. This closes the circuit to the solenoid coil 49 for closing the valve 16, which remains closed until relay CR1 shunts out condenser C2. When tube 115 ceases firing, coil 49 is de-energized and valve 16 is opened, thereby admitting fluid through the bubbler tube 15. This shift of relay CR2 also breaks the shunt circuit to capacitor C1 of timer 83 and this starts its timed interval.

By way of summary, the two timers 83 and 115 are operated to control the frequency of a preselected size (time interval) of bubbles of gas admitted through the bubbler tube 15. At the start of a cycle, the tube 115 is firing by having its condenser C2 fully charged and the negative grid bias thereby removed from tube 115. This condition sets relay CR2 to energize coil 49 and hold the valve 16 closed. Relay CR2 will have also opened the shunt circuit to condenser C1 and the time interval of timer 83 is thereby started. Depending on the position at which the instrument 77 has placed the slide 81 on potentiometer 82 and the band adjustment selected by the position of pointer 87 for determining voltage effect of potentiometer 82 will establish the cathode to grid potential or negative grid bias on the tube 95. The time element necessary to charge the condenser C1 to a positive potential to balance the grid bias will be the timed interval before tube 95 fires. As this tube 95 fires, relay CR1 closes which shunts across condenser C2 and extinguishes tube 115. Up to now, the tube 115 has been conducting. As tube 115 is cut off, relay CR2 shifts to de-energize coil 49 and open valve 16. At the same time, relay CR2 closes the shunt circuit across condenser C1 causing tube 95 to cease it firing, whereupon relay CR1 will open circuit 113, 114 and remove the shunt across condenser C2. Condenser C2 is now charging for its time interval to reach a positive potential to balance the negative bias on tube 115. This time interval is the "on" time of timer circuit 110. At the end of this interval, tube 115 will again fire and shift relay CR2 to initiate the "off" timer interval, as well as re-energize coil 49 and close the valve 16.

The above preferred form of the invention utilizes a relay CR2 which is a two circuit relay that has the one circuit of coil 49 normally open and the second circuit normally closed. This operates the valve 16, as aforesaid, to introduce high pressure fluid to bubbler tube 15 when the coil 49 is de-energized. It is possible to cause the valve to be operated to "open" by power in coil 49 and be otherwise normally closed, by substituting a double pole, single throw relay at CR2 (not shown). In this variation of the control system, both of the circuits of relay CR2 would be normally closed and opened by the firing of tube 115. Thus, in the "on" timer interval when tube 115 is extinguished, the circuit for coil 49 would be made by the normally closed relay CR2, and the valve 16 opened to admit high pressure fluid to bubbler tube 15.

The above described control provides a variable frequency in the "off" time of the timers to produce a variable frequency of bubbles produced by the bubbling tube 15 in response to changes in glass temperature sensed by the thermocouple and recorder components 60, 77.

A further variant of this control is to permit temperature-responsive control in varying bubble size at the bubbler unit 9. This is accomplished by utilizing a preselected frequency, or "off" timer interval, and regulating the "on" timer interval by the thermocouple-recorder components of the system for varying the volume of high pressure fluid that is admitted to form the successive bubbles. This form of control is shown on FIGURE 7. In the following description of the system of FIGURE 7, the same reference numerals are used to denote the same elements of structure wherever they are individually the same as in FIGURE 6.

Thus, in FIGURE 7, the "off" timer 83' circuit is constructed with the following changes. In place of the instrument-regulated potentiometer 82, a manually set potentiometer, as 140, is substituted in the cathode circuit of the thyratron 95. Thus, the cathode to grid potential of tube 95 is determined by the preselected manual setting of potentiometer 140 and for that setting and with any selected setting for series of resistors 101–104, the charging time for condenser C1 will be the same between successive bubbles. Thus, the frequency of the "off" timer is constant.

The "on" timer 110' is modified by having its manually-controlled potentiometer replaced by the recorder-controlled potentiometer 82, connected by the linkage 80 from recorder 77 to its slide 81. The group of band proportioning resistors 86–92 in parallel with potentiometer 82 is also connected across potentiometer 82 and, thus, the cathode to grid potential of tube 115 is now variable as between cycles. The valve 16 is shown as being regulated in the same manner as the above-described preferred arrangement; that is, the valve is closed by energizing the coil 49 and opened whenever coil 49 is de-energized. In this case, therefore, the relay CR2 takes the form of a two circuit relay having one circuit to the coil 49 normally open and the other shunt circuit across condenser C1 normally closed.

The electrical operation of the control is much the same as earlier described. Beginning a cycle, tube 115 is firing and this shifts relay CR2 to energize coil 49 and hold valve 16 closed and, at the same time, opens the shunt circuit across condenser C1 which is charging to perform the "off" time interval in accordance with the preselected resistance network of potentiometer 120 and resistance 130 placing a predetermined bias on tube 95 and the resistance network 101–104 for the positive charging potential of condenser C1. At the end of this interval, tube 95 fires and closes relay CR1 which de-energizes tube 49. This causes relay CR2 to de-energize coil 49 and open valve 16 and at the same instant shunts condenser C1 and extinguishes tube 95, so as to open relay CR1 and permit charging condenser C2. The bias potential on tube 115 is now regulated by the potentiometer 82 set by recorder 77 in conjunction with resistors 106, 107 and any of resistors 86–91. This regulates the time interval for C2 in order to charge sufficiently positive to cause tube 115 to again fire. At that point, relay CR2 energizes coil 49 and sets the end of the interval for introduction of high pressure fluid to bubbler tube 15. This interval is, accordingly, variable with sensed changes in temperature conditions in the glass body G.

A further variation of this last embodiment is available similarly as in the case of the circuit of the first-described embodiment, FIGURE 6. Valve 16 may be opened by energizing coil 49 and otherwise normally closed through substituting for relay CR2 a double pole, single throw relay (not shown) in place of the two circuit relay with one circuit normally open and the other circuit normally closed, as shown. Using the double pole, single throw relay, both circuits of relay CR2 would be normally closed and opened by having tube 115 conducting so that when tube 115 is cut off, the power circuit for coil 49 is closed and valve 16 opened by the latter to admit high pressure fluid to bubbler tube 15. When tube 115 again conducts, valve 16 is reclosed.

In the embodiment of the invention illustrated in FIGURE 8 of the drawings, the glass body G is locally agitated by means of a stirring rod 150 rather than the bubbler unit 16 heretofore described. This stirrer 150 comprises a generally cylindrical shaft 151 surrounded by a helical screw flight 152 oriented along the shaft 150 so as to provide an upwardly sweeping current of glass in proximity to the stirrer.

The stirrer 150 is driven by means of a sprocket 153 secured to the free lower end of the shaft 151 and lapped by a chain 154 driven by a suitable means (not shown), such as a variable speed electric motor. That portion of the shaft projecting through the furnace bottom wall 11 is retained in a water cooled bearing collar 155 having an inner, cylindrically apertured bearing wall 156 surrounded by an annular coolant chamber 157 through which water or similar coolant is circulated by means of an inlet pipe 158 and an outlet pipe 159.

The stirrer 150 may be internally water cooled, if desired, or may be made of a metal or alloy, such as molybdenum, capable of resisting the temperatures of the molten glass G. Located in proximity to the stirrer 150 is a temperature responsive unit 60 for controlling the rotation of the stirrer 150 and the degree of agitation imparted thereby to the molten glass G. This degree of agitation may be controlled by either varying the speed of rotation of the shaft 150 or by starting and stopping rotation. In any event, the degree of agitation is controlled in accordance with the temperature sensed by the element 60. Rotation of the stirrer 150 will generate non-thermal eddy currents in the same manner as the release of the bubbles A, as illustrated in FIGURE 4 of the drawings.

I claim:

1. In an apparatus for reducing the temperature gradient between different levels of a body of molten glass, means for sensing the temperature of the glass at a given level, and means operable in response to said sensing means for agitating the body of molten glass whenever the temperature so sensed departs from a desired temperature, said last-named means inducing in said body a non-thermal convection current effective to admix glass at said given level with glass at a different level and to thereby more nearly equalize the temperature of said body.

2. In an apparatus for controlling the lower level temperature in a body of molten glass contained in a chamber of a glass furnace, means for sensing the lower level temperature in a region of said chamber, means for agitating the glass at said region to obtain a vertical flow of currents therein and means responsive to said sensing means for actuating said agitating means whenever the sensed temperature departs from a desired temperature.

3. In an apparatus for reducing the temperature gradient between different levels of a body of molten glass, a temperature responsive element located at a given level in said body, actuatable bubbler means for agitating the body of molten glass, and means actuated by said element for actuating said bubbler means to create in said body a nonthermal convection current effective to admix glass at said given level with glass at a different level.

4. In an apparatus for controlling the temperature of a body of molten glass normally of different temperatures at different levels throughout the depth of the body, the means for sensing the temperature of the body at one of said levels, means for agitating the glass body, means for varying the degree of agitation provided by said agitating means, and means for increasing the degree of agitation whenever the sensed temperature varies from a desired temperature, the increased degree of agitation being effective throughout substantially the entire depth of said body and in proximity to the sensing location to admix glass from said different levels with glass from said one level.

5. In an apparatus for reducing the temperature differential between the upper hotter levels and the lower colder levels of a molten glass body in a combustion-type glass furnace, means for continuously sensing the temperature of the lower level glass, a plurality of agitating means disposed in said glass body in proximity to said sensing means to effect a flow of glass between said levels, and means responsive to said sensing means for actuating all of said agitating means whenever the sensed temperature drops below a predetermined minimum.

6. In a method of reducing the temperature gradient between the upper hotter level and the lower cooler level of a body of molten glass in a combustion fired glass melter, the improvement residing in the steps of sensing the temperature of the glass at said lower level, agitating the body of molten glass and varying the intensity of agitation inversely with the sensed temperature to induce in said body of glass a non-thermal convection current effective to admix cooler glass at said lower level with hotter glass from said upper level thereby increasing the temperature of said lower level.

7. In a method as defined in claim 6, the further improvement wherein the step of agitating is carried out by bubbling a gaseous medium upwardly through the body of molten glass and the intensity of the agitation is varied by varying the intensity of bubbling.

8. In a method as defined in claim 6, the further improvement wherein the step of agitating is carried out by stirring the body of molten glass and the intensity of agitation is varied by varying the speed of stirring.

References Cited by the Examiner

UNITED STATES PATENTS

| | | | |
|---|---|---|---|
| 1,992,581 | 2/1935 | Reeder | 137—90 |
| 2,081,595 | 5/1937 | McIntosh | 65—162 |
| 2,602,461 | 7/1952 | Walkev | 137—90 |
| 2,890,548 | 6/1959 | Wright | 65—134 |
| 2,915,299 | 12/1959 | Woebcke | 137—90 |

DONALL H. SYLVESTER, *Primary Examiner.*